April 25, 1967  J. V. CLARKE, JR., ET AL  3,316,167
MULTI-CELL REACTOR IN SERIES Filed Sept. 1, 1961

John V. Clarke, Jr.
Charles H. Worsham     Inventors

By *Olin B. Johnson*
                        Patent Attorney

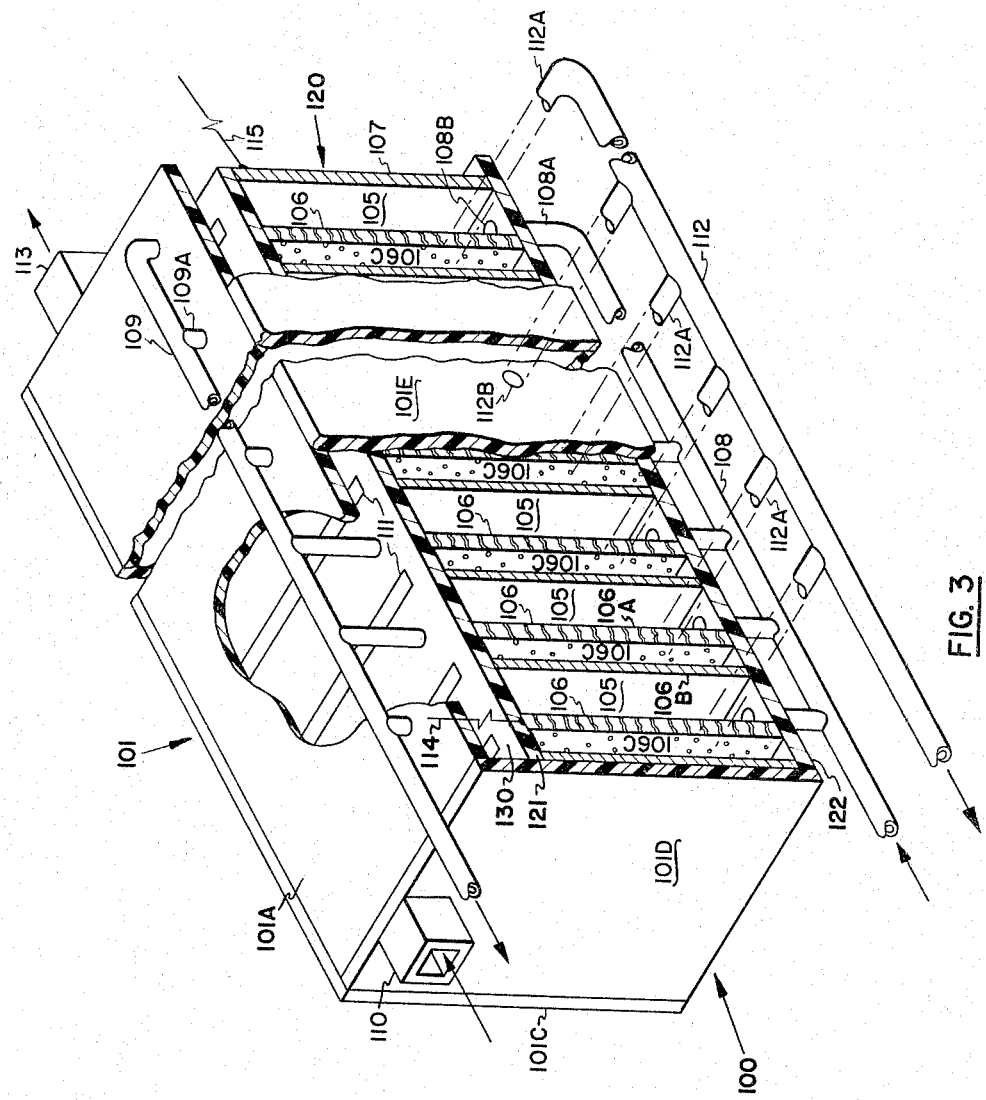

United States Patent Office 3,316,167
Patented Apr. 25, 1967

3,316,167
MULTI-CELL REACTOR IN SERIES
John V. Clarke, Jr., Cranford, and Charles H. Worsham, Fanwood, N.J., assignors to Esso Research and Engineering Company, a corporation of Delaware
Filed Sept. 1, 1961, Ser. No. 135,670
1 Claim. (Cl. 204—268)

The present invention relates to means for improving the assembly and operation of a plurality of electrochemical cells in combinations hereinafter referred to as "cell packs" or "multi-cell electrochemical reactors." In particular, this invention relates to the design and assembly of apparatus comprising in combination a plurality of electrochemical cells in series and adapted for continuous partial oxidation processes.

One embodiment of this invention relates to a novel bipolar electrode and to its employment in multi-cell reactors comprising a plurality of externally powered electrolytic cells electrically connected in series.

A second embodiment of this invention relates to a novel bipolar electrode and to its employment in multi-cell reactors comprising a plurality of power generating fuel cells electrically connected in series.

Electrochemical oxidation of organic compounds in both fuel cells and electrolytic cells is known in the art.

The term "fuel cell" is used herein and in the art to denote a device or apparatus wherein hydrogen or an organic compound of lower oxidation state than carbon dioxide is oxidized electrochemically with resulting net production of electrical energy. The overall fuel cell reaction is the sum of two essentially independent half-cell reactions. At the anode, a combustible fuel such as hydrogen, carbon monoxide, or a carbon and hydrogen-comprising compound is oxidized with a release of electrons to such electrode. At the cathode, oxygen continuously admitted from an outside source accepts electrons and is reduced. Water is formed as a product of the ions formed at the respective electrodes and this with the oxidation products of an organic feedstock, when such is employed, constitute the chemical or non-electrical products of the reaction. The electrical circuit is completed by ion transfer between electrodes through the electrolyte and electron transfer between electrodes by conductors positioned outside such electrolyte. Catalysts which may be the same or different are associated with the surfaces of the opposing electrodes which are exposed to the electrolyte. The fuel cell may be employed to produce valuable chemicals simultaneously with such power production where the feedstock comprises a hydrogen-containing organic compound of at least two oxidation states lower than carbon monoxide and such oxidation is terminated before conversion to the simple oxides of carbon. Thus, alcohols, ketones and carboxylic acids may be selectively produced electrochemically from suitable organic feedstocks of lower oxidation state by removing such products from the cell at their respective oxidation states.

The term "electrolytic cell" is used herein and in the art to denote an externally powered electrochemical cell wherein anodic oxidation of an organic compound is effected in a manner similar to the aforedescribed fuel cell process but without a net production of electrical energy. In this type of cell a direct electric current from an external power source, e.g. an alternating current rectifier, fuel cell pack, etc., is admitted to the cathode in lieu of the oxidizing gas employed at the fuel cell cathode. Since water is dissociated in the operation of such cell, it must be replenished as the reaction proceeds.

The processes to which the apparatus of this invention is directed are more efficiently carried out by employing large groups of relatively small cells in combination in a single compact unit or multi-cell reactor. Such reactors may be constructed with the cells electrically connected either in series or parallel. In the reactors of this invention the cells are connected in series. In large installations these reactors may themselves be combined in series and/or parallel as best suits the individual requirements of the installation and the processes to be carried out therein. To avoid prohibitive losses of voltage from internal resistance the distance between electrodes must be limited, e.g. about ¼ inch or less. The size of the electrodes employed also becomes important since construction problems increase with increases in the superficial surface area of the electrode, especially when relatively brittle materials such as porous carbon, are used. When structural strength is achieved by increasing the thickness of porous electrodes, losses due to internal resistance increase. When carbon dioxide is a product of the anodic oxidation, either by accident or design, the escape of this gas from the electrolyte compartment with its attendant problems of electrolyte level control can be more easily controlled in smaller cells.

It is, therefore, an object of the instant invention to provide apparatus whereby a large number of electrochemical cells may be used in series connection in a compact, simplified cell pack.

It is a further object of this invention to provide a compact reactor comprising a novel arrangement of electrochemical cells connected in series through novel bipolar electrodes and adapted for continuous production and recovery of a pratial oxidation product of an organic feedstock, e.g. a process wherein such feedstock is an organic compound comprising carbon and hydrogen said product is also an organic compound comprising carbon and hydrogen but one which contains at least one more oxygen atom per molecule than such feedstock.

Other objects of the instant invention will appear in a more detailed description of the instant invention given below.

Accordingly, reference is made to the accompanying drawings forming a part of this specification.

FIGURE 3 is a perspective view of another embodiment of the invention showing an enclosed cell pack or multi-cell reactor comprising a plurality of fuel cells connected in series via novel bipolar electrodes of the type shown in FIGURE 2.

Figure 1:
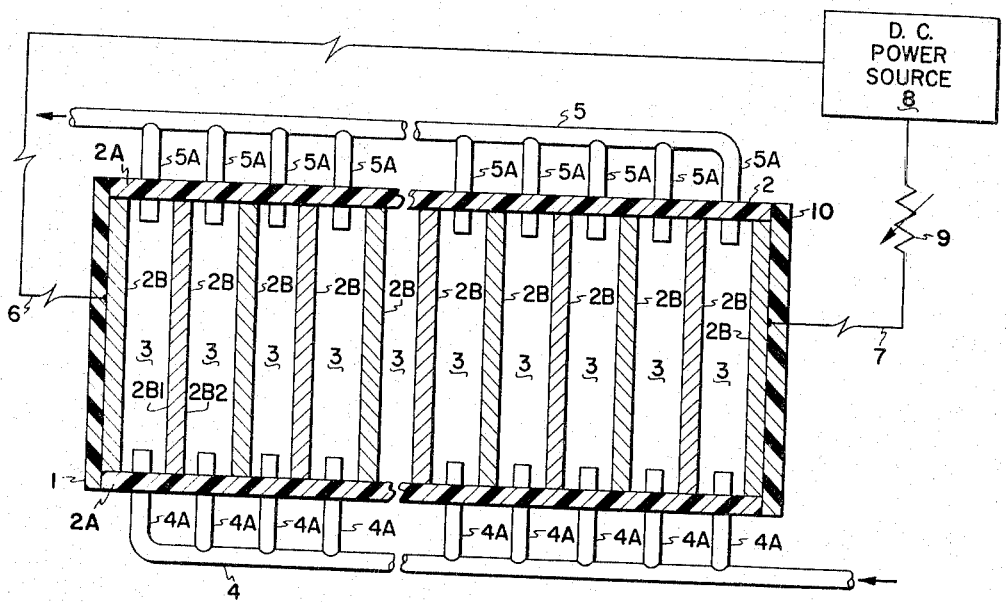
FIGURE 1 is a side view in cross-section of one embodiment of the invention showing an externally powered multi-cell reactor comprising a plurality of electrolytic cells in series electrical connection.

Referring first to FIGURE 1, there is shown a multi-cell electrochemical reactor 1 comprising a ladder-like reactor frame 2, conduit means 4, 4A, 5 and 5A and an external electrical circuit represented by wires 6 and 7, power source 8, variable resistance means 9, and enclosure means 10. Reactor frame 2 is made up of parallel support plates 2A of a suitable nonconductive material, e.g. electrolyte resistant, solid polymeric materials, glass, etc., and a plurality of parallel, bipolar electrode plates 2B rigidly associated with said support plates 2A so as to form a row of essentially equal and parallel rectangular channels. Reactor frame 2 is sealingly associated with nonconductive enclosure means 10. In order to show the interior components of the cell pack, only two side wall members of enclosure means 10 are shown. However, these and the other side wall members, not shown, are associated with reactor frame 2 so as to enclose the rectangular channels formed by 2A and 2B thereby forming a row of box-like cells enclosing electrolyte compartments 3 which communicate with conduits 4A and 5A. Enclosure means 10 is constructed of a suitable nonconductor and sealingly associated with reactor frame 2.

Electrode plates 2B are plate-like conductors having two opposing surfaces 2B1 and 2B2 surfaced with catalytic materials which may be the same or different. Surfaces 2B1 and 2B2 respectively comprise the anode and the cathode of adjacent cells. The portion of the electrical circuit internal to the reactor is established through ionic conductance across electrolyte compartments 3 and electron conduction through plates 2. The circuit is completed by conduction means, wires 6 and 7, in electrical connection with the terminal electrodes. Wires 6 and 7 are shown in electrical connection with a source of direct electric current or its equivalent 8, e.g. storage batteries, fuel cell pack, or an alternating current rectifier. Variable resistance means 9 is shown in this external circuit to provide a control means for potential and/or reaction rates for the partial oxidation process to be carried out in this reactor. Conduit means 4, 4A, 5A and 5 admit of reversing the direction of fuel and product recovery streams as desired. Additional conduits, not shown, may be utilized to remove hydrogen evolved in the process from an aqueous electrolyte where it is not practical to remove same with other vaporous product, e.g. when top fueling is employed and liquid product is recovered as bottoms. The catalysts to be employed upon surfaces 2B1 and 2B2 do not, as such, comprise a part of this invention and any of the conventional electrochemical catalysts, which are good conductors, e.g. noble metals, may be employed. The metal plate supporting the catalyst should either be a metal that is essentailly inert to the electrolyte to be employed, e.g. aqueous KOH or $H_2SO_4$, or be surfaced with the catalyst or other metals to prevent chemical attack by the electrolyte. Electrolyte dividers, such as ion-exchange membranes, may be employed, if desired, between the opposing electrodes of each cell.

Figure 2:
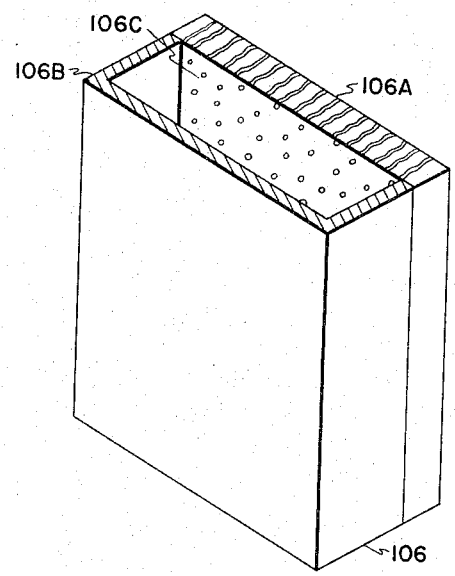
FIGURE 2 is an isometric view of a bipolar electrode for use in a multi-cell fuel cell reactor.

Referring now to FIGURE 2, there is shown a novel bipolar electrode 106 for use in a multi-cell reactor employing oxygen breathing fuel cells in series connection. Electrode 106 comprises a porous cathode element 106A of a suitable conductive material, e.g., a porous carbon plate, in electrical connection with an anode element 160B comprising a U-shaped plate of suitable metal which may be integrally formed of a single metal or may constitute a support base having a continuous metal surface. Selection of such metals should, of course, take into consideration the electrolyte to be used in contact therewith. Cathode member 106A may be impregnated with catalyst in accordance with techniques well known in the art. Cathode member 106A and anode member 106B are sealingly associated so as to form an oxygen receiving channel 106C through which a stream of air or other oxidizing gas may be passed with a portion thereof entering the pores of 106A so as to form an interface with aqueous electrolyte therein. The use of electrode 106 is shown further in FIGURE 3.

Referring now to FIGURE 3 there is shown a fuel cell pack 100 with the cells thereof in series and adapted for either power or power and chemical production. Cell pack 100 is made up of a watertight outer thousing or enclosing means 101, a reaction unit 120, conduit means 108, 108A, 109, 109A, 110, 112, 112A and 113, and an external electrical circuit represented by wire leads 114 and 115. Housing 101, as here shown, comprises a top member 101A and side wall members 101C, 101D and 101E. To better illustrate the cell components and the internal arrangement of the cell pack, the pack is shown with one side wall removed along with portions of 101A and 101E. Housing 101 forms with the top of reaction unit 120 a manifold 130 from which oxygen, e.g. air, is supplied to the individual cells as hereinafter described in greater detail. As here shown, reaction unit 120 is made up of a top support member 121, a bottom support member 122, a plurality of hollow, bipolar electrodes 106 and a right terminal unipolar electrode 107. Top support member 121 is a flat sheet of a suitable nonconductive material and is positioned in parallel relationship with bottom support member 122 which is of similar construction and may be formed of the same or different nonconductor. Bottom support member 122 is sealingly associated with housing 101 so as to form a vessel that is watertight except for the means of ingress and egress hereinafter mentioned in the description of the conduit means associated with reaction unit 120. In the alternative housing 101 may itself include a bottom member upon which support member 122 rests. Electrodes 106 and 107 are rigidly associated with support members 121 and 122 so as to divide the space therebetween into essentially equal and parallel rectangular channels which in cooperation with housing 101, with which they are sealingly associated, form a plurality of parallel box-like cells encompassing electrolyte compartment 105. Electrodes 106 comprise a porous cathode element 106A and a nonporous U-shaped anode element 106B which with support members 121 and 122 form oxidant channels 106C. The electrodes herein, as in FIGURE 1, may be detachably connected to the support members and to the outer housing so as to admit of removal for cleaning, resurfacing and repair. Air or oxygen feed conduits 110 and 113 connect manifold 130 with the atmosphere or an air pumping means, not shown. In operation of the reactor air enters manifold 130 via conduit 110 and passes through slots or passageways 111 in support member 121. Slots 111 communicate with air receiving chambers 106C. Excess air entering manifold 110 may leave the system via conduit 113 or, in the alternative, air may be admitted to manifold 130 through both 110 and 113 where the length of the reactor is such that a single air feed is insufficient. In operation air entering chambers 106C enters the pores of the cathode elements 106A and therein contacts electrolyte from electrolyte compartments 105 which enters such pores from the opposite side of 106A. Excess air and oxygen depleted air exits from air chamber 106C via outlets 112B and conduits 112A which communicate with air trunk conduit 112 which exhausts to the atmosphere.

Electrolyte chambers 105 have an opening 108B in the lower wall thereof and through this communicate with a lower conduit system formed by pipes or tubes 108A and 108. Chambers 105 also communicate with an upper conduit system formed by pipes or tubes 109A and 109. In the operation of the reactor one of these conduit systems will provide fueling means for admitting the oxidizable fuel to the electrolyte or a fuel and electrolyte mixture to the chambers 105. Cells of this design require that the fuel to be oxidized be soluble in the electrotlyte either per se or with the employment of an intermediary or cosolvent. When the conduit system represented by pipes or tubes 109 and 109A are employed for fueling, product recovery will be made by removal of a partial oxidation product and electrolyte via pipes or tubes 108A and 108. Electrolyte may then be separated from the product stream and recycled to the reactor either through the fueling stream or by other conduits, not shown. In the alternative the reactor is adapted for fueling through pipes 108 and 108A with product recovery through pipes 109A and 109. This method of fueling is employed when the organic product to be recovered from chambers 105 is recovered as a vapor or gas. Wire leads 114 and 115 represent leads to an external circuit, not further shown here, whereby electrical communication between the anodic and cathodic elements of the reactor is established and from which electrical energy generated by the electrochemical reactions occurring within the reactor can be withdrawn for use as power.

The active components of fuel cells are well known and need not be described in detail. Suitable catalysts, electrolytes, oxidants and fuels are well known. This invention provides novel apparatus for more efficient utilization of the fuel cell principle and a more effective use of any particular catalyst, electrolyte, etc. As aforementioned, the over-all fuel cell reaction is the sum of two essentially independent half-cell reactions. Hence, any suitable catalytic material may be employed upon the electrode surfaces which will promote the intended half-cell reaction at such electrode. Naturally, the acidity or basicity of the aqueous electrolyte to be used will be considered in choosing the catalysts as well as the components and materials of construction.

It will be understood that the terms "fuel electrode" and "anode" may be used interchangeably as may the terms "oxygen electrode" and "cathode."

The term "porous electrode" as employed herein refers to a foraminous structure admitting of the passage of a gas or liquid therethrough at atmospheric pressure.

Other modifications consistent with the spirit of the invention will suggest themselves to those skilled in the art and it is intended to cover them, so far as the prior art permits by the following claim.

What is claimed is:

An electrochemical reactor having a plurality of electrochemical cells in series electrical connection and comprising in combination two nonconductive support members in parallel relationship; a row of hollow bipolar electrodes extending at right angles from said support members so as to divide the space between said support members into essentialy equal and parallel, rectangular channels; nonconductive enclosure means sealingly associated with said channels so as to form adjacent reaction vessels each having two opposite side walls formed by said electrodes; a plurality of conduit means communicating with each of said vessels; and conductor means associated with the terminal electrodes of said row establishing therewith an electrical circuit, wherein each of said hollow bipolar electrodes comprises a porous carbon plate sealingly associated in direct abutting relationship with a U-shaped integrally formed metal anode plate so as to form an oxidant receiving chamber and is associated with inlet and outlet means admitting of the passage of an oxidizing gas through said oxidant receiving chamber.

References Cited by the Examiner

UNITED STATES PATENTS

| | | | |
|---|---|---|---|
| 718,249 | 1/1903 | Haas | 204—269 X |
| 2,384,463 | 9/1945 | Gunn et al. | 136—86 |
| 2,390,591 | 12/1945 | Janes | 204—129 |
| 2,925,454 | 2/1960 | Justi et al. | 136—86 |
| 2,925,455 | 2/1960 | Eidensohn | 136—86 |
| 2,969,315 | 1/1961 | Bacon | 136—86 |
| 3,101,285 | 8/1963 | Tantram et al. | 136—120 |

HOWARD S. WILLIAMS, *Primary Examiner.*

JOHN H. MACK, *Examiner.*

D. R. JORDAN, *Assistant Examiner.*